United States Patent Office 2,789,098
Patented Apr. 16, 1957

2,789,098

SYNTHETIC RESIN COMPOSITIONS AND PROCESS FOR MAKING SAME

Harold A. Collinson, Brockenhurst, England, assignor to Leicester, Lovell & Company Limited, North Baddesley, Southampton, England No Drawing. Application June 30, 1949,
Serial No. 102,434

16 Claims. (Cl. 260—17.3)

This invention relates to synthetic resin compositions and to processes for forming such compositions. In particular, the invention relates to resin condensates having a non-crazing agent physically admixed therewith.

Synthetic resins have been widely used for many purposes, such as adhesives in conjunction with hardeners such as acids or acid catalysts which cause the resin to polymerize and cure to an infusible, insoluble state. When such resins are employed for adhesively uniting two surfaces, they have a serious disadvantage in that relatively thick layers of the adhesive exhibit a tendency to craze and disintegrate with consequent weakening of the adhesive bond. When such surfaces to be bonded together are accurately machined and fit intimately, difficulties due to crazing are seldom experienced. However, when the surfaces being bonded are rough or uneven, or where it is not possible or desirable to apply adequate pressure to the material, such resin condensates, when used with the aforementioned hardeners, form a layer or localized layers of appreciable thickness between the surfaces and in course of time crazing and disintegration occur in some cases with consequent deterioration of the strength of the adhesive bond.

Many attempts have been made to overcome the problem of crazing by modifying the ingredients employed or by varying the ratio of the ingredients used to form such adhesives, but such attempts have not been entirely satisfactory, especially where an aqueous solvent is used for preparing and dissolving the adhesive. Moreover, when attempts are made to modify the adhesive, the adhesive properties are usually impaired or the stability or shelf life is lowered, resulting in an adhesive having inferior gluing properties.

Accordingly, it was a general object of the present invention to overcome the crazing tendencies of synthetic resins.

A further object of the invention was to provide a resin composition which would possess craze-resistant characteristics after curing and upon ageing.

Another object of the invention was to provide a synthetic resin, such as an adhesive, containing a non-crazing agent.

A further object of the invention was to provide a method for preparing a resin adhesive by physically admixing a non-crazing agent therewith, which composition would overcome the difficulties heretofore encountered in the prior art.

Other objects of the invention will in part be obvious and will in part appear hereinafter.

According to the present invention, it has been found that crazing of a resin composition of the class described is inhibited by admixing a non-crazing agent with the resin, said non-crazing agent comprising furfuraldehyde. In the preferred embodiment, a cellulose filler is combined with the synthetic resin composition prior to, during, or after the addition of the non-crazing agent.

The invention accordingly comprises the several steps and the relation of one or more of such steps with respect to each of the others thereof, which will be exemplified in the process hereinafter disclosed, and the scope of the invention will be indicated in the claims.

The synthetic resin composition is formed by reacting an amine of the class consisting of urea and thiourea, or mixtures thereof, with formaldehyde. In the preferred embodiment, there is employed a urea-formaldehyde resin containing formaldehyde to urea in the proportion of from 1 to 2.5 mols of formaldehyde to 1 mol of urea, but other ratios of formaldehyde to urea may be employed which vary within this range.

The substance used to produce non-crazing characteristics in the resin, when cast or used as an adhesive, comprises furfuraldehyde. The furfuraldehyde is added in an amount varying between 35 to 67 parts by weight per 100 parts by weight of the resin solids, and operates to best advantage as a non-crazing agent within these limits.

The cellulose filler, which is advantageously employed in most instances, comprises a fibrous filler, such as wood flour, light cotton waste, alphacellulose, shredded paper pulp such as sulfite pulp, nut shell flour such as that formed by comminuting walnut shell, pecan shell, and the like. Varied amounts of the cellulose filler may be used with the resin, depending upon the consistency desired in the final product. For example, when an adhesive is being prepared an amount of filler may be added which produces an adhesive of the consistency of a thin glue, up to that amount which produces the consistency of a crack filler, such as plastic wood. A cellulose filler is necessary only to provide a medium for making a homogeneous mix of the resin condensate and the furfuraldehyde. It has been noted in many cases that when furfuraldehyde is added to a ureaformaldehyde liquid resin the furfuraldehyde has a tendency to separate out when added to such liquid. Separation, however, does not occur as readily as when the furfuraldehyde is physically admixed with a thiourea-formaldehyde liquid resin. The filler, therefore, acts as an absorbent material for the furfuraldehyde where there is a tendency for the furfuraldehyde to separate out of the liquid. There may be employed, in the formation of an adhesive, from zero parts to 35 parts by weight of cellulose filler per 100 parts by weight of the resin solids. Very satisfactory results have been obtained by mixing 50 parts by weight of furfuraldehyde to 50 parts by weight of a cellulose filler, and thereafter admixing said furfuraldehyde-filler mixture with 100 parts by weight of a 100% solids resin condensate of the class described.

The non-crazing agent is preferably always mixed with the resin after condensation of the resin components has taken place. If the non-crazing agent is mixed with the resin components prior to reaction, the non-crazing agent, in many instances, will co-react with the urea, thiourea, or similar substance and will thus form a 3-component reaction product in combination with the formaldehyde or other aldehyde present. Thus, it is preferred that the non-crazing agent not be co-reacted during the formation of the synthetic resin condensate, because otherwise the products thus produced will not have the properties desired when the products are used as adhesives, coatings, or the like. In making up the mixture of synthetic resin and the non-crazing agent, the fibrous filler is preferably first admixed with the furfuraldehyde and then incorporated in the resin, although in some instances the non-crazing agent may be mixed with the resin condensate before or after adding the cellulose filler. However, in those instances where the non-crazing agent is not compatible with the resin condensate, it is preferred that the non-crazing agent be added to the cellulose filler prior to incorporating the mixture in the resin as described above.

Various hardening agents may be employed for hardening the resin, such as organic or inorganic acids, salts which are of an acidic nature or which decompose to release an acid substance, latent acid catalysts, and the like. Such hardening agents comprise sodium bisulfate, ammonium chloride, mixtures of such salts, and the like. When the resin condensate is used in liquid form as an adhesive, hardening may be effected by either of two methods known in the industry as (a) the combined method and (b) the separate application method. If the combined application method is employed, a certain percentage of the acid or acid-producing substance, or solution of such substances, is mixed with the adhesive condensate and then spread on one or both surfaces of the materials to be joined, and if feasible the joint is then placed under pressure for a period depending upon the strength and rapidity of the hardening agent used. The concentration and the type of hardening agent also controls the pot life of the adhesive-hardener mixture. If the separate application method is employed, the hardener is placed into solution and then brushed onto one of the surfaces to be joined and allowed to dry. The resin adhesive is then spread by means of a roller or a brush onto either the same surface or the opposite surface of the materials to be joined and the two surfaces are then brought into contact and placed under pressure. This method is usually more rapid in reaction than the combined application method.

Although the details set out above refer generally to gluing at normal atmospheric and room temperatures, they can also be applied to the use of the resin condensate at higher artificially induced temperatures such as are obtained by pressing in hot presses, high frequency current and heating ovens.

The following examples are given by way of illustrating the invention and not by way of limitation. Unless otherwise stated, all parts given are by weight.

*Example 1*

Ten (10) parts of wood flour were intimately mixed with twenty (20) parts by weight of furfuraldehyde in a suitable mixing machine. There was then added to this mixture eighty (80) parts by weight of a condensation product having a pH of 7–8 and having a solids content of 65 to 70% resin. The resin condensate was prepared in a separate vessel by reacting 140 parts by weight of urea with 360 parts of 40% formaldehyde (by volume) under slightly acid pH conditions and at an elevated temperature. During and after condensation of the urea and formaldehyde, the condensate was finally concentrated to the aforesaid solids content of 65 to 70% by evaporation and removal of the water present. The resin condensate and the wood flour, impregnated with the furfuraldehyde, were then mixed together and worked up to a smooth, homogeneous product.

Discs prepared by mixing some of this product with a suitable hardener and pouring it into flat molds or petri dishes and allowed to harden and solidify remain in their entirety and do not disintegrate nor craze.

The material made in accordance with this example complied with the British Ministry of Aircraft Production Material specification D. T. D. 484 December, 1942. Joints having a gap of 50 thousandths of an inch (0.050) between the surfaces being united can be prepared in accordance with the conditions laid down in the aforesaid specification D. T. D. 484 and will comply with the conditions of test of that specification. Further, long-term tests over a period of months have shown that no appreciable reduction in strength occurs, whereas a "non gap-filling cement" will not comply with the conditions specified.

*Example 2*

In a urea-formaldehyde liquid condensate normally prepared by reacting 1 mol of urea with 1.9 mols of formaldehyde, and consisting of 60% resin solids, 10% of the urea normally employed was substituted with dicyandiamide. There was then added 17.5 parts by weight of wood flour per 100 parts liquid resin. A sample of the resin thus prepared was cured as a casting. The casting crazed within one month at 70° F. Furfuraldehyde was admixed with the remainder of the resin condensate in the proportion of 32.5 parts of furfuraldehyde per 100 parts of liquid resin, the filler being present in the ratio of 17.5 parts per 100 parts of liquid resin. A casting formed from this mass was allowed to cure. The casting did not craze or crack after standing for five months at 70° F.

*Example 3*

A thiourea-formaldehyde resin was prepared by condensing 1 mol of thiourea with 2 mols of formaldehyde at a pH of 5.25, adjustment of the pH being made by the addition of sufficient acetic acid. The mixture was then refluxed until a sample withdrawn from the reaction vessel clouded at 25° C. The resin was then neutralized to a pH of 8.0 through the addition of 30% caustic soda solution and water removed in vacuo to a viscosity of 45 R. P. M. Stormer (500 gram weight at 21° C.). When 100 parts of this resin were mixed with 6 parts of 8% aqueous ammonium chloride solution as a catalyst, the casting obtained upon curing at 140° F. showed bad crazing and cracking after 8 months. However, when 35 parts furfuraldehyde were employed in addition to the ingredients mentioned, a casting was obtained which exhibits no cracking or crazing after 8 months at 140° F. When 100 parts of the resin were cured with 6 parts of 8% ammonium chloride solution, after being mixed with 35 parts furfuraldehyde and 20 parts fir flour, a casting was obtained which was stable and exhibited no cracking or crazing after 8 months' storage at 140° F. When a mixture was made composed of 100 parts resin, 6 parts 8% aqueous ammonium solution, and 10 parts fir flour, (but no furfuraldehyde), a casting was obtained which exhibited crazing after 8 months' storage at 140° F.

*Example 4*

To 100 parts of a urea-formaldehyde resin containing 60% solids by weight, prepared by condensing 1 mol of urea with 1.9 mols of formaldehyde, there was added 65 parts of a modified filler prepared by impregnating 32.5 parts of wood flour with 32.5 parts of furfuraldehyde. There was then added to this mixture 9 parts of an 8% ammonium chloride solution. When cured at room temperature, castings obtained using this composition exhibited no tendency toward crazing after 5 months at 70° F.

*Example 5*

A urea-formaldehyde resin condensate was prepared by refluxing 720 grams of urea with 720 grams of paraformaldehyde under neutral conditions until a sample withdrawn from the reaction vessel clouded when cooled to 35° C. The reaction medium was then adjusted to a pH of 5.5 and refluxed until a Gardner "C" viscosity was obtained. After neutralizing the resin it was then dehydrated in vacuo to 60% resin solids content.

To 100 parts of this product there was added a premixed composition consisting of 32.5 parts wood flour and 32.5 parts furfuraldehyde. To this mixture there was then added 9 parts of an 8% ammonium chloride aqueous solution. Castings resulting from curing this composition exhibited no crazing or fracture after standing 5 months at room temperature.

*Example 6*

A thiourea-formaldehyde resin was prepared by condensing at reflux temperature 1 mol of thiourea with 2 mols of formaldehyde at a pH of 5.25 until a withdrawn sample of the product clouded upon cooling to 25° C.

After neutralizing the product it was concentrated in vacuo to a Stormer viscosity of 45 R. P. M. (500 gram weight at 21° C.). There was then added 35 parts of furfuraldehyde which was thoroughly mixed with 100 parts of the resin. No filler was added. When cured with 6 parts 8% ammonium chloride solution, castings made from this composition exhibited no crazing or fracture of any form after 8 months in storage at 140° F.

*Example 7*

A thiourea-formaldehyde resin was prepared by condensing at reflux temperature 1 mol of thiourea with 2 mols of formaldehyde at a pH of 5.25, until a sample of the product when withdrawn clouded upon cooling to 25° C.

After neutralizing the product it was then concentrated in vacuo to a Stormer viscosity of 45 R. P. M. (500 gram weight at 21° C.). Then 20 parts of wood flour were impregnated with 35 parts furfuraldehyde and this mass thoroughly mixed with 100 parts of the resin. When this composition was cured by adding 6 parts of 8% ammonium chloride solution, castings were obtained which exhibited no crazing or fracture of any form after standing 8 months in storage at 140° F.

The resin composition of the present invention containing the furfuraldehyde non-crazing agent admixed with the resin may also be used for treating materials, such as fabric, for the purpose of imparting thereto the impermeable characteristics of the resin without the danger or disadvantage of crazing or cracking tendencies. When the composition is used for treating fabrics, it has been found advantageous to dissolve 100 parts by weight of a powdered resin condensate, e. g. urea-formaldehyde, in 65 parts by weight of water and thereafter adding 37 parts by weight of furfuraldehyde, together with a suitable hardening agent. This mixture is then coated on canvas or other material and allowed to harden.

As pointed out, many advantages are attained by following the teachings of the present invention. A firm joint is produced when the composition is used as an adhesive containing the non-crazing agent and materials secured together with such composition do not separate or crack after ageing or standing for long periods of time. Thus, wood which has been secured together using such composition has shown to result in 100% wood failure when attempts are made to separate the wood from the adhesive. Moreover, adhesives of the class described which do not craze on ageing comply with the rigid specifications set for aircraft production. Castings made with such compositions show little or no tendency to crack or craze upon ageing. Such compositions are of decided advantage when used for making tableware, knife handles, or the like.

This application is a continuation-in-part of U. S. Serial No. 504,041, filed September 27, 1943, now abandoned and U. S. Serial No. 25,314, filed May 5, 1948, now abandoned.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A water-soluble synthetic resin composition comprising a resin condensate physically admixed with furfuraldehyde as a non-crazing agent, said resin condensate being the product of reacting formaldehyde with an amine of the class consisting of urea and thiourea.

2. A water-soluble synthetic resin composition comprising a resin condensate physically admixed with furfuraldehyde as a non-crazing agent, said resin condensate being the product of reacting formaldehyde with an amine of the class consisting of urea and thiourea, wherein the furfuraldehyde employed is within the range of 35 to 67 parts by weight to 100 parts by weight of resin solids.

3. A water-soluble synthetic resin composition comprising a cellulose filler and a resin condensate physically admixed with furfuraldehyde as a non-crazing agent, said resin condensate being the product of reacting formaldehyde with an amine of the class consisting of urea and thiourea.

4. A water-soluble synthetic resin composition comprising a resin condensate formed by reacting formaldehyde with an amine of the class consisting of urea and thiourea and a cellulose filler and a non-crazing agent comprising furfuraldehyde physically mixed with the resin, wherein the furfuraldehyde employed is within the range of 35 to 67 parts by weight to 100 parts by weight of resin solids.

5. A water-soluble synthetic resin composition comprising a resin condensate physically admixed with furfuraldehyde as a non-crazing agent, said resin condensate being the product of reacting formaldehyde with thiourea.

6. A water-soluble synthetic resin composition comprising a resin condensate physically admixed with furfuraldehyde as a non-crazing agent, said resin condensate being the product of reacting formaldehyde with urea.

7. A water-soluble synthetic resin composition comprising a resin condensate and a non-crazing agent comprising furfuraldehyde physically admixed therewith, wherein the furfuraldehyde employed is within the range of 35 to 67 parts to 100 parts by weight of resin solids, said resin condensate being the product of reacting 1 to 2.5 mols of formaldehyde with 1 mol of urea.

8. In forming a water soluble synthetic resin composition comprising a resin condensate formed by reacting formaldehyde with an amine of the class consisting of urea and thiourea and having improved non-crazing characteristics, the process comprising mixing 50 parts by weight of furfuraldehyde to 50 parts by weight of a cellulose filler and thereafter admixing said furfuraldehyde-filler mixture with said resin condensate in an amount equivalent to 100 parts by weight of resin solids.

9. In forming a water-soluble synthetic resin composition comprising a resin condensate formed by reacting formaldehyde with an amine of the class consisting of urea and thiourea and having improved non-crazing characteristics, the process comprising mixing from 35 to 67 parts by weight of furfuraldehyde with an amount up to 35 parts by weight of cellulose filler, and thereafter admixing said furfuraldehyde-filler mixture with said resin condensate in an amount equivalent to 100 parts by weight of resin solids.

10. In forming a water-soluble synthetic resin composition comprising a resin condensate formed by reacting formaldehyde with an amine of the class consisting of urea and thiourea and having improved non-crazing characteristics, the process comprising reacting said resin and adding a cellulose filler to said resin at a point substantially near the end of said condensation stage and thereafter mixing furfuraldehyde with said resin condensate containing the cellulose filler, the amount of furfuraldehyde added being from 35 to 67 parts by weight and the amount of cellulose filler added being an amount up to 35 parts by weight for 100 parts by weight of resin solids.

11. In forming a water-soluble synthetic resin composition comprising a resin condensate formed by reacting formaldehyde with urea and having improved non-crazing characteristics, the process comprising mixing from 35 to 67 parts by weight of furfuraldehyde with an amount up to 35 parts by weight of cellulose filler and thereafter admixing said furfuraldehyde-filler mixture with said resin condensate in an amount equivalent to 100 parts by weight of resin solids.

12. In forming a water-soluble synthetic resin composition comprising a resin condensate formed by reacting formaldehyde with thiourea and having improved non-crazing characteristics, the process comprising mixing from 35 to 67 parts by weight of furfuraldehyde with an amount up to 35 parts by weight of cellulose filler and thereafter admixing said furfuraldehyde-filler mixture with said resin condensate in an amount equivalent to 100 parts by weight of resin solids.

13. In forming a water-soluble synthetic resin composition comprising a resin condensate formed by reacting formaldehyde with urea and having improved non-crazing characteristics, the process comprising mixing 50 parts by weight of furfuraldehyde to 50 parts by weight of a cellulose filler and thereafter admixing said furfuraldehyde-filler mixture with said resin condensate in an amount equivalent to 100 parts by weight of resin solids.

14. In forming a water-soluble synthetic resin composition comprising a resin condensate formed by reacting formaldehyde with thiourea and having improved non-crazing characteristics, the process comprising mixing 50 parts by weight of furfuraldehyde to 50 parts by weight of a cellulose filler and thereafter admixing said furfuraldehyde-filler mixture with said resin condensate in an amount equivalent to 100 parts by weight of resin solids.

15. In forming a water-soluble synthetic resin composition, the process comprising forming a resin condensate by reacting 1 to 2.5 mols of formaldehyde with 1 mol of urea, mixing from 35 to 67 parts by weight of furfuraldehyde with an amount up to 35 parts by weight of cellulose filler, thereafter admixing the furfuraldehyde-filler mixture with said resin condensate in an amount equivalent to 100 parts by weight of resin solids, the resulting resin composition having improved non-crazing characteristics.

16. A water-soluble synthetic resin composition comprising a resin condensate and a non-crazing agent comprising furfuraldehyde physically admixed therewith, wherein the furfuraldehyde employed is within the range of 35 to 50 parts by weight to 100 parts by weight of resin solids, said resin condensate formed by reacting about 1 to 2 mols of formaldehyde with 1 mol of urea.

References Cited in the file of this patent

UNITED STATES PATENTS

| | | |
|---|---|---|
| 1,536,881 | Ellis | May 5, 1925 |
| 2,332,303 | D'Alelio | Oct. 19, 1943 |

FOREIGN PATENTS

| | | |
|---|---|---|
| 560,693 | Great Britain | Apr. 17, 1944 |